United States Patent
Ha et al.

(10) Patent No.: US 9,514,565 B2
(45) Date of Patent: Dec. 6, 2016

(54) IMAGE PROCESSING APPARATUS AND METHOD

(75) Inventors: In Woo Ha, Seoul (KR); Tae Hyun Rhee, Yongin-si (KR); Yong Beom Lee, Seoul (KR); Do Kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 13/432,583

(22) Filed: Mar. 28, 2012

(65) Prior Publication Data
US 2013/0002694 A1    Jan. 3, 2013

(30) Foreign Application Priority Data
Jun. 30, 2011   (KR) .................. 10-2011-0064703

(51) Int. Cl.
*G06T 15/50*    (2011.01)

(52) U.S. Cl.
CPC ................ *G06T 15/50* (2013.01)

(58) Field of Classification Search
CPC ......... G06T 15/506; G06T 15/50; G06T 15/60
USPC .................. 345/581, 426, 589; 382/274, 264
See application file for complete search history.

(56) References Cited

U.S. PATENT DOCUMENTS

| | | | |
|---|---|---|---|
| 7,262,771 B2 * | 8/2007 | Snyder et al. | 345/426 |
| 7,609,265 B2 * | 10/2009 | Sloan et al. | 345/426 |
| 8,483,479 B2 * | 7/2013 | Kunkel et al. | 382/165 |
| 2009/0027391 A1 * | 1/2009 | Burley et al. | 345/426 |

FOREIGN PATENT DOCUMENTS

| | | |
|---|---|---|
| KR | 10-2005-0035069 | 4/2005 |
| KR | 10-0609145 | 8/2006 |
| KR | 10-2007-0056174 | 6/2007 |
| KR | 10-0932830 | 12/2009 |
| KR | 10-2011-0031643 | 3/2011 |
| KR | 10-2011-0032366 | 3/2011 |

OTHER PUBLICATIONS

Robin Green. "Spherical harmonic lighting: The gritty details." Archives of the Game Developers Conference, Mar. 2003.*
Peter-Pike Sloan, Jan Kautz, and John Snyder's paper titled "Precomputed Radiance Transfer for Real-Time Rendering in Dynamic, Low-Frequency Lighting Environments" (ACM Transactions on Graphics, Proceedings of the 29th Annual Conference on Computer Graphics and Interactive Techniques (SIGGRAPH), pp. 527-536. New York, NY: ACM Press, 2002).

* cited by examiner

*Primary Examiner* — Jacinta M Crawford
*Assistant Examiner* — Shivang Patel
(74) *Attorney, Agent, or Firm* — NSIP Law

(57) ABSTRACT

An image processing apparatus. The image processing apparatus may perform filtering to emphasize a surface lighting of a low frequency band from an input lighting environment image, and may also perform at least one virtual point light (VPL) sampling from the input lighting environment image. The image processing apparatus may perform precomputed radiance transfer (PRT) based rendering using the filtered lighting environment image and VPL based rendering using the sampled VPL.

21 Claims, 9 Drawing Sheets

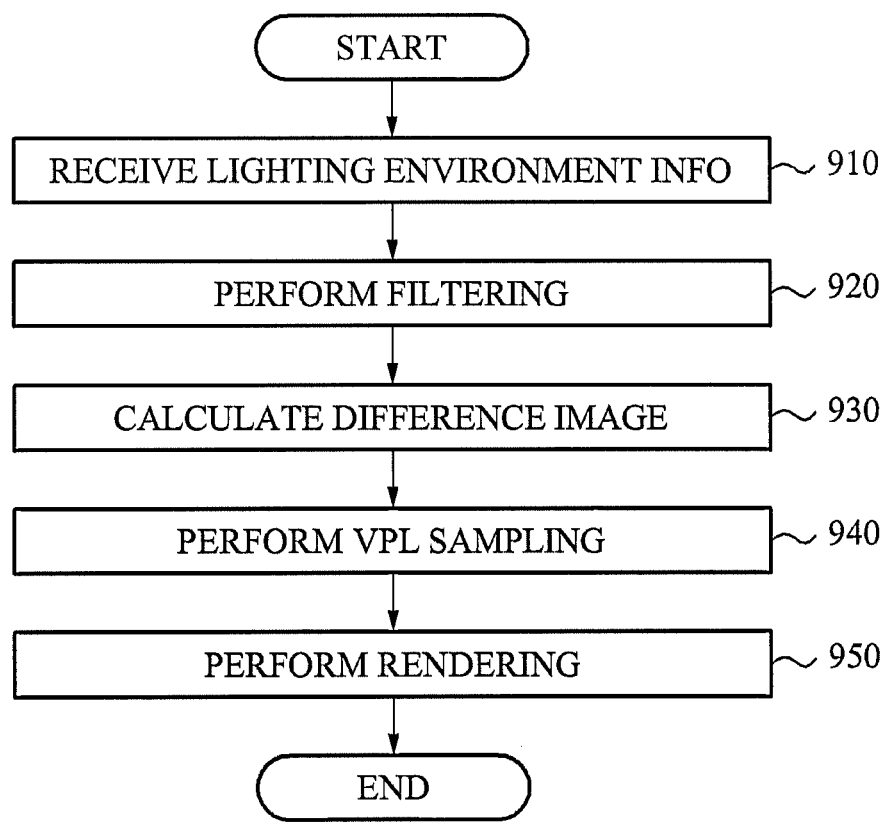

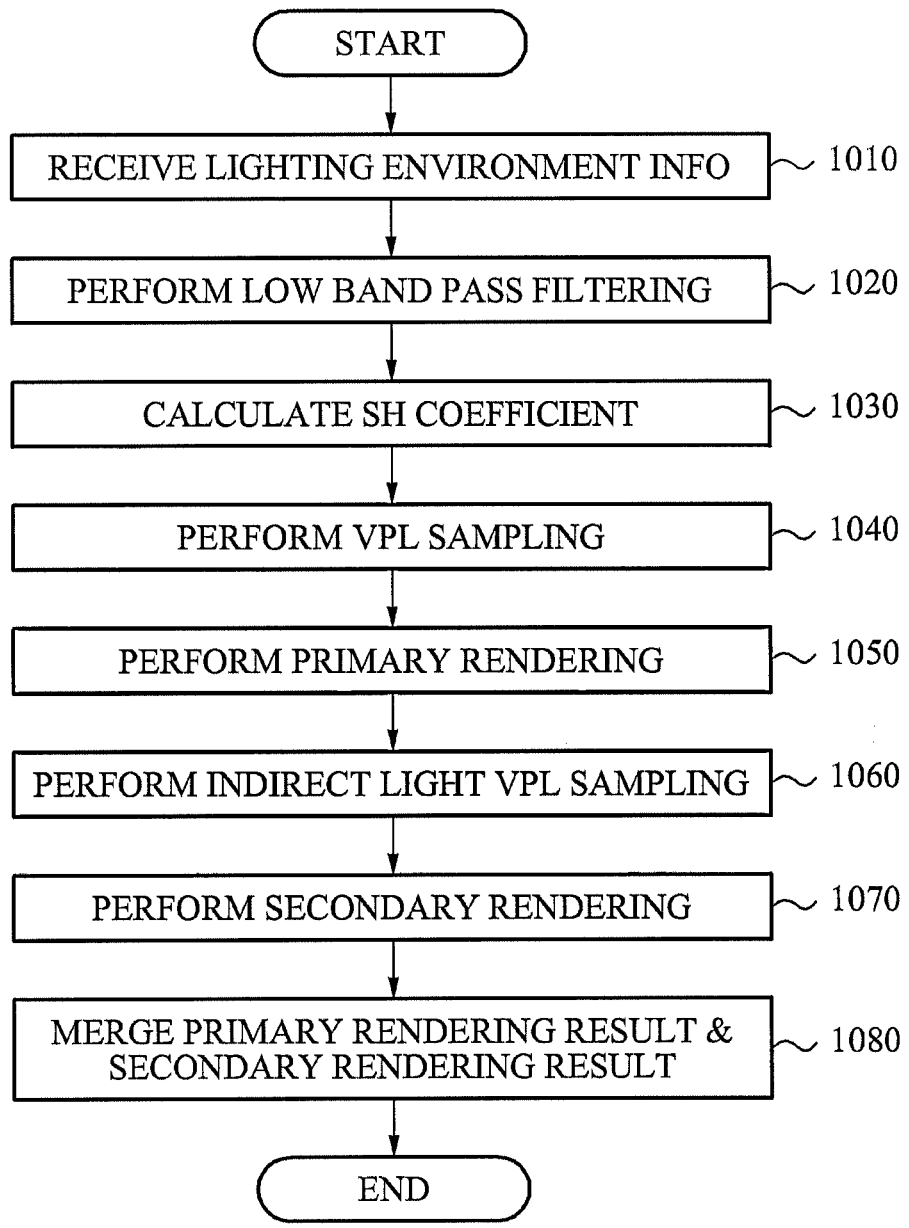

IMAGE PROCESSING APPARATUS AND METHOD

CROSS-REFERENCE TO RELATED APPLICATIONS

This application claims the priority benefit of Korean Patent Application No. 10-2011-0064703, filed on Jun. 30, 2011, in the Korean Intellectual Property Office, the disclosure of which is incorporated herein by reference.

BACKGROUND

1. Field

One or more embodiments relate to an image processing apparatus and method, and more particularly, to an apparatus and method that may perform modeling of lighting environments and render an image.

2. Description of the Related Art

Currently, research about realistically rendering an object of a three-dimensional (3D) model has been actively conducted. To render the 3D model, modeling of lighting environments in addition to object information may need to be appropriately performed.

Among researches of modeling lighting environments, Peter-Pike Sloan, Jan Kautz, and John Snyder' paper titled "*Precomputed Radiance Transfer for Real-Time Rendering in Dynamic, Low-Frequency Lighting Environments*" (ACM Transactions on Graphics, Proceedings of the 29th Annual Conference on Computer Graphics and Interactive Techniques (SIGGRAPH), pp. 527-536. New York, N.Y.: ACM Press, 2002) discloses a method of obtaining spherical harmonics (SH) coefficients by projecting low frequency lights to basis functions for SH.

However, the above method may have some constraints in specular or glossy expression in an environment where small light sources are arranged in a complex form.

Modeling of lighting environments using virtual point lights (VPL) may be useful for the specular or glossy expression. However, it may be inefficient in that a relatively large number of VPLs may be used to express a large area light.

SUMMARY

The foregoing and/or other aspects are achieved by providing an image processing apparatus including a filtering unit to filter an input lighting environment image including information about at least one of a position and energy corresponding to at least one light source, and to generate a filtered lighting environment image in which a low frequency component in the input lighting environment image is emphasized, a difference image calculator to calculate a difference image showing a difference between the filtered lighting environment image and the input lighting environment image, and a virtual point light (VPL) sampling unit to perform importance based VPL sampling with respect to the difference image.

The importance based VPL sampling may be to arrange a VPL at a portion having at least a predetermined threshold in the difference image.

The filtering unit may generate the filtered lighting environment image by performing Gaussian blurring of the input lighting environment image.

The image processing apparatus may further include a precomputed radiance transfer (PRT) calculator to express the filtered lighting environment image based on a PRT.

The PRT calculator may calculate a spherical harmonics (SH) coefficient corresponding to each of at least one basis function for SH by projecting the filtered lighting environment image to each of the at least one basis function for SH.

The image processing apparatus may further include a rendering unit to render an image of at least one object using the SH coefficient and a VPL.

The VPL sampling unit may further sample at least one indirect light VPL using the rendering result.

The foregoing and/or other aspects are achieved by providing an image processing apparatus including a filtering unit to perform low band pass filtering of an input lighting environment image including information about at least one of a position and energy corresponding to at least one light source, and to generate a filtered lighting environment image in which a surface light source of a low frequency component is emphasized, a PRT calculator to calculate an SH coefficient corresponding to each of at least one basis function for SH by projecting the filtered lighting environment image to each of the at least one basis function for SH, a VPL sampling unit to sample at least one direct light VPL by performing importance based VPL sampling with respect to the input lighting environment image, and a rendering unit to render an image of at least one object using the SH coefficient and the direct light VPL.

The low band pass filtering may correspond to Gaussian blurring.

The VPL sampling unit may further sample at least one indirect light VPL using the rendering result. The rendering unit may render the image of the at least one object by further employing the indirect light VPL.

The foregoing and/or other aspects are achieved by providing a method of processing an image in an image processing apparatus, the method including filtering, by a filtering unit of the image processing apparatus, an input lighting environment image including information about at least one of a position and energy corresponding to at least one light source, to generate a filtered lighting environment image in which a low frequency component in the input lighting environment image is emphasized, calculating, by a difference image calculator of the image processing apparatus, a difference image showing a difference between the filtered lighting environment image and the input lighting environment image, and performing, by a VPL sampling unit of the image processing apparatus, importance based VPL sampling with respect to the difference image.

The image processing method may further include calculating, by a PRT calculator of the image processing apparatus, an SH coefficient corresponding to each of at least one basis function for SH by projecting the filtered lighting environment image to each of the at least one basis function for SH.

The image processing method may further include rendering, by a rendering unit of the image processing apparatus, an image of at least one object using the SH coefficient and a direct light VPL.

The image processing method may further include sampling, by the VPL sampling unit, at least one indirect light VPL using the rendering result.

The foregoing and/or other aspects are achieved by providing a method of processing an image in an image processing apparatus, the method including performing, by a filtering unit of the image processing apparatus, low band pass filtering of an input lighting environment image including information about at least one of a position and energy corresponding to at least one light source, to generate a filtered lighting environment image in which a surface light source of a low frequency component is emphasized, calculating, by a PRT calculator of the image processing apparatus, an SH coefficient corresponding to each of at least one basis function for SH by projecting the filtered lighting environment image to each of the at least one basis function for SH, sampling, by a VPL sampling unit of the image processing apparatus, at least one direct light VPL by performing importance based VPL sampling with respect to the input lighting environment image, and rendering, by a rendering unit of the image processing apparatus, an image of at least one object using the SH coefficient and the direct light VPL.

The image processing method may further include sampling, by the VPL sampling unit, at least one indirect light VPL using the rendering result, rendering, by the rendering unit, an additional image of the at least one object using the indirect light VPL, and providing, by the rendering unit, a result image by merging the additional image and the image.

The example embodiments may include an image processing apparatus and method that may efficiently express a large area light and may also efficiently express a small complex light source.

The example embodiments may also include an image processing apparatus and method that may have a relatively excellent reality of lighting environment modeling compared to a calculation processing amount.

Additional aspects of embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of embodiments, taken in conjunction with the accompanying drawings of which:

FIG. 9 illustrates an image processing method according to example embodiments; and FIG. 10 illustrates an image processing method according to other example embodiments.

DETAILED DESCRIPTION

Figure 1:
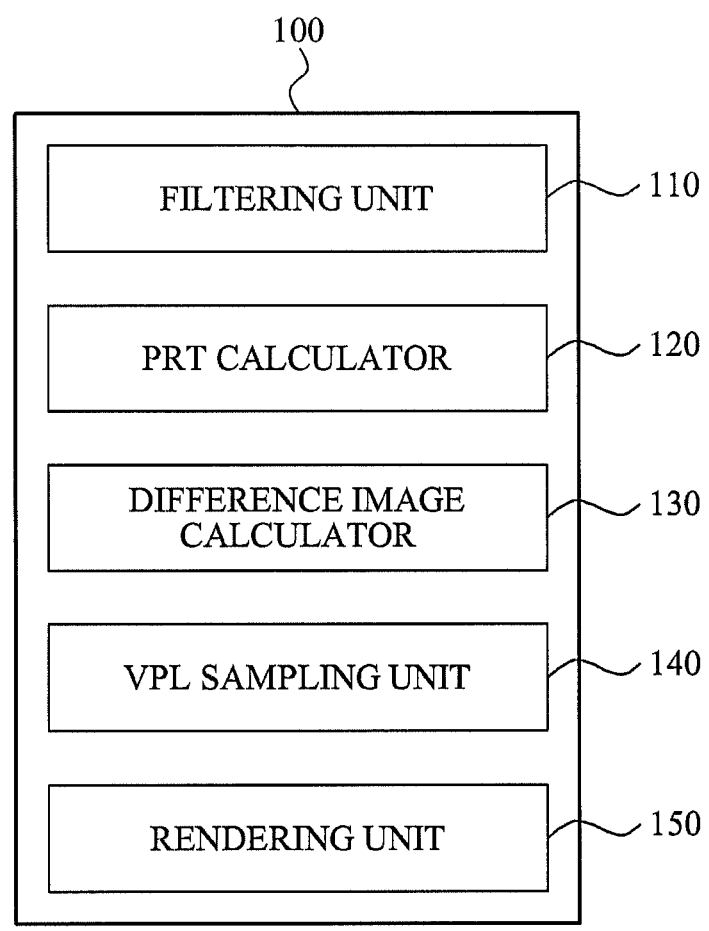
FIG. 1 illustrates an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to example embodiments.

Figure 3:
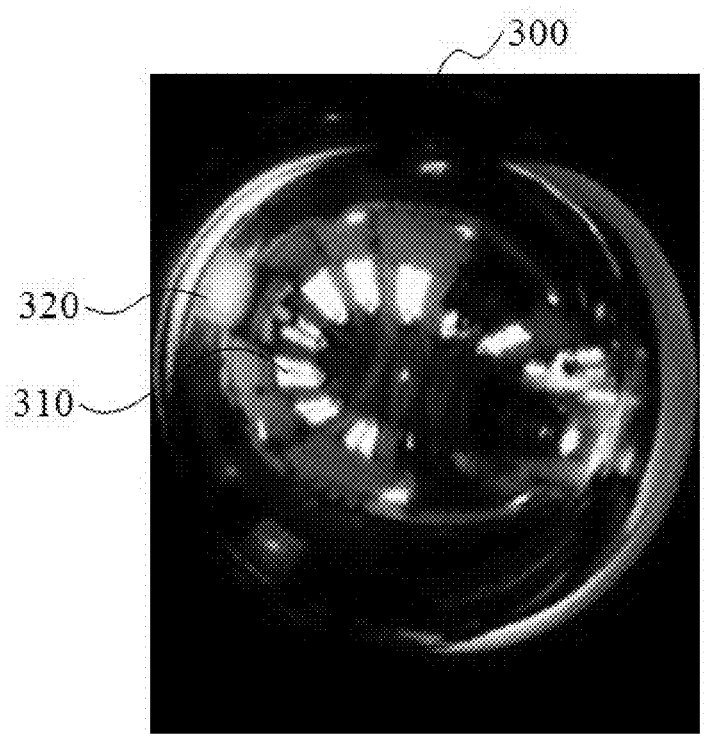
FIG. 3 illustrates an input lighting environment image according to example embodiments.

A lighting environment image may be input into the image processing apparatus 100. The lighting environment image may indicate a predetermined type of data that includes information about lighting environments affecting a three-dimensional (3D) model, for example, information about a position of a light source, energy thereof, a color thereof, and the like, Therefore, the lighting environment image may not be constrained to a general image and thereby be interpreted. An example of the lighting environment image is shown in FIG. 3.

A filtering unit 110 may filter the input lighting environment image. The filtering unit 110 may generate a filtered lighting environment image in which a low frequency component in the input lighting environment image is emphasized, by filtering out a high frequency component and passing the low frequency component. For example, a Gaussian blurring process may be understood as the above filtering process. An example of the filtered lighting environment image will be described with reference to FIG. 4.

A precomputed radiance transfer (PRT) calculator 120 may perform PRT calculation with respect to the filtered lighting environment image.

The PRT calculation may correspond to a process of expressing the filtered lighting environment image in which the low frequency component is emphasized, based on wavelets or spherical harmonics (SH).

For example, the PRT calculator 120 may calculate an SH coefficient corresponding to each of at least one basis function for SH by projecting the lighting environment image to each of the at least one basis function for SH. Examples of basis functions will be described with reference to FIG. 5.

SH coefficients may be used for image rendering with respect to an object together with a bidirectional reflectance distribution function (BRDF) of the object and the like.

Through the above process, a large area light in an actual lighting environment may be realistically reflected for rendering with relatively simple calculation.

However, the specular or glossy effect of a small light, particularly, a point light with respect to an object may not be well expressed. Therefore, according to embodiments, a virtual point light (VPL) sampling unit 140 may express the specular or glossy effect by sampling at least one VPL.

Various embodiments may be applied for the VPL sampling process.

A difference image calculator 130 may calculate a difference image between the filtered lighting environment image and the original input lighting environment image. The VPL sampling unit 140 may perform importance based sampling of the difference image and thereby sample at least one VPL.

An example of the difference image will be described with reference to FIG. 6. A process of sampling a VPL from the difference image will be described with reference to FIG. 7 and FIG. 8.

Each portion within the difference image may correspond to one of a positive value, a negative value, and zero.

This is because the energy intensity, for example, a brightness of a predetermined portion may increase or decrease or be the same during a filtering process.

That an absolute value of a value of a predetermined portion in the difference image is great may indicate that the value has significantly varied during the filtering process. This portion may correspond to a high frequency component.

Accordingly, a VPL may be sampled in the above portion. Specifically, when the absolute value is greater than or equal to a predetermined threshold, a VPL may be sampled.

According to other embodiments, the VPL sampling unit 140 may perform VPL sampling by employing a predetermined method in a direct input lighting environment image. In this example, a difference image may not be generated.

A rendering unit 150 may render an image of an object using an SH coefficient and a VPL. Various embodiments, for example, a radiosity, ray-tracing, and the like, may be employed for the rendering scheme and thus, are not limited to some rendering schemes.

Due to the above process, both the smooth light effect by a large area light with a low frequency and the specular and glossy effect by a small light with a high frequency may be well expressed.

As described above, since a light is modeled by applying a separate method to each of low frequency and high frequency, embodiments may be hybrid modeling of lighting environment.

All of VPLs sampled during the above process may represent a direct light and an indirect light generated by a reflection, a refraction, and the like of light on the surface of an object may not be used.

Therefore, the VPL sampling unit 140 may sample additional VPLs that represent the indirect light effect, using a primary rendering result of the rendering unit 150. Hereinafter, the additional VPLs may also be referred to as 'indirect light VPLs'.

The rendering unit 150 may perform secondary rendering of objects using the indirect light VPLs and then generate a final result image by merging the primary rendering result and the secondary rendering result.

Figure 2:
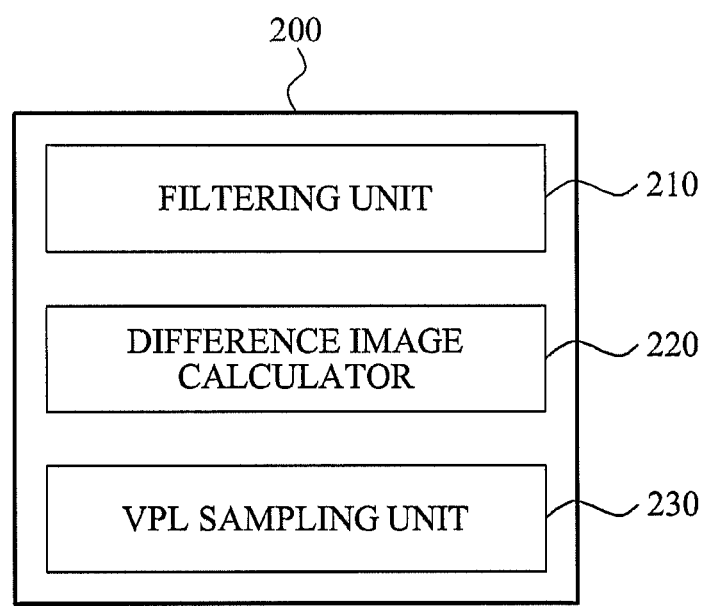
FIG. 2 illustrates an image processing apparatus according to other example embodiments.

FIG. 2 illustrates an image processing apparatus 200 according to other example embodiments.

Referring to FIG. 2, the image processing apparatus 200 may include a filtering unit 210, a difference image calculator 220, and a VPL sampling unit 230.

The filtering unit 210 may filter an input lighting environment image and generate a filtered lighting environment image in which a low frequency component is emphasized. A Gaussian blurring process and the like may be understood as the above filtering process.

The difference image calculator 220 may calculate a difference image between the filtered lighting environment image and the original input lighting environment image.

Each portion within the difference image may correspond to one of a positive value, a negative value, and zero. This is because the energy intensity, for example, a brightness of a predetermined portion may increase or decrease or be the same during the filtering process.

That an absolute value of a value of a predetermined portion in the difference image is great may indicate that the value has significantly varied during the filtering process. This portion may correspond to a high frequency component.

Therefore, the VPL sampling unit 230 may sample at least one VPL in a portion of the difference image having a value greater than or equal to a predetermined threshold.

By performing VPL sampling as above, it is possible to efficiently perform importance based VPL sampling with respect to the input lighting environment image. Accordingly, the specular or glossy effect may be well expressed.

FIG. 3 illustrates an input lighting environment image 300 according to example embodiments.

The lighting environment image 300 may provide information about a position of a light in the spherical space, intensity thereof, a characteristic thereof, and the like.

For example, it can be known from the lighting environment image 300 about positions and shapes of a white florescent light 310, an orange light 320, and the like.

However, when rendering color values of an object by employing the actual lighting environment image 300 as is, an amount of calculations may significantly increase. Therefore, a light modeling may need to be performed to appropriately decrease an amount of calculations.

Figure 4:
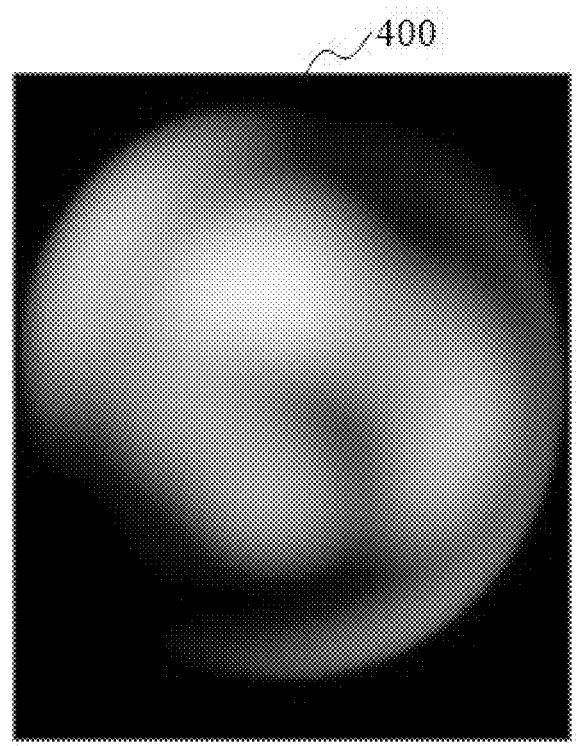
FIG. 4 illustrates a result of low band pass filtering the input lighting environment image of FIG. 3 according to example embodiments.

FIG. 4 illustrates a result, that is, a filtered lighting environment image 400 of low band pass filtering the input lighting environment image 300 of FIG. 3 according to example embodiments.

The above filtering process may correspond to a Gaussian blurring process. Referring to FIG. 4, small lights have been ignored and the whole lighting environment has been expressed with smooth large area lights that can be separable into a plurality of areas.

For example, only a low frequency component of the lighting environment image 300 may remain and a high frequency component may be filtered out.

A process of rendering an object using the filtered lighting environment image 400 may be performed by calculating coefficients corresponding to respective basis functions for SH and by calculating a color value through an operation with a BRDF of the object using the calculated basis functions for SH.

Figure 5:
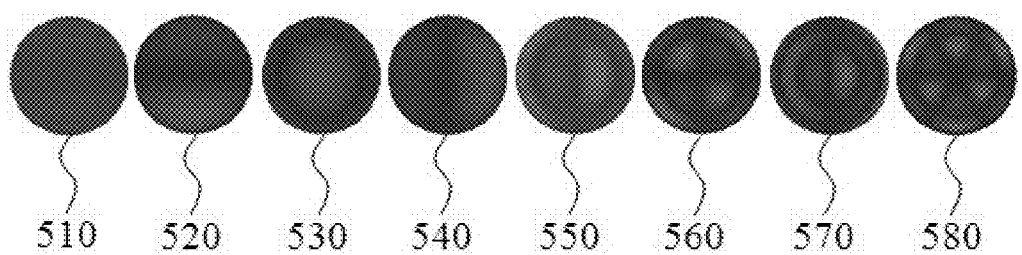
FIG. 5 illustrates basis functions for spherical harmonics (SH) according to example embodiments.

FIG. 5 illustrates basis functions 510, 520, 530, 540, 550, 560, 570, and 580 for SH according to example embodiments.

To calculate SH with respect to a 3D spherical space, a plurality of orthogonal basis functions may need to be set. Various embodiments of the basis functions may be applied.

The basis functions 510, 520, 530, 540, 550, 560, 570, and 580 of FIG. 5 provided as one embodiment may be an example of low frequency SH basis functions. Blue portions may indicate negative values and red portions may indicate positive values.

The above basis functions may be understood that Fourier functions are three dimensionally used. When projecting the lighting environment image 400 of FIG. 4 to each of the basis functions 510, 520, 530, 540, 550, 560, 570, and 580, an SH coefficient corresponding to each of the basis functions 510, 520, 530, 540, 550, 560, 570, and 580 may be obtained.

Figure 6:
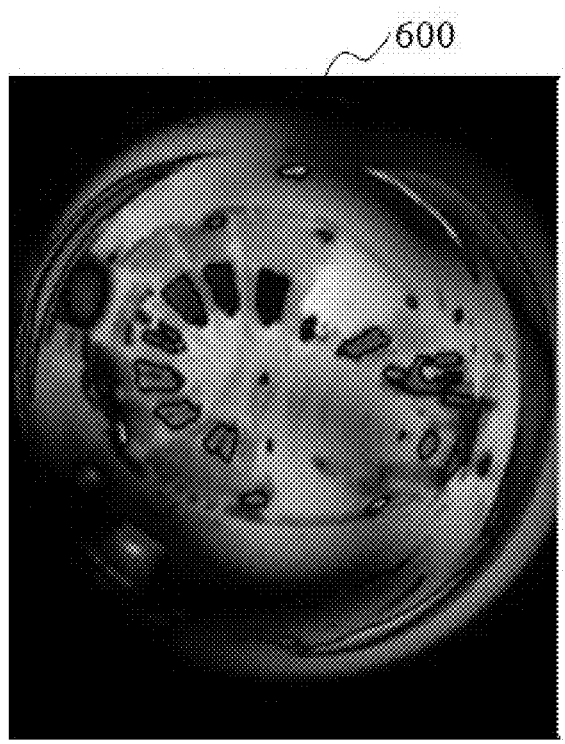
FIG. 6 illustrates a difference image according to example embodiments.

FIG. 6 illustrates a difference image 600 according to example embodiments.

As described above with reference to FIG. 1 and FIG. 2, the difference image 600 shows a difference between the original input lighting image 300 and the filtered lighting environment image 400.

Each portion within the difference image 600 may correspond to one of a positive value, a negative value, and zero. This is because the energy intensity, for example, a brightness of a predetermined portion may increase or decrease or be the same during a filtering process.

That an absolute value of a value of a predetermined portion in the difference image is great may indicate that the value has significantly varied during the filtering process. This portion may correspond to a high frequency component.

Figure 7:
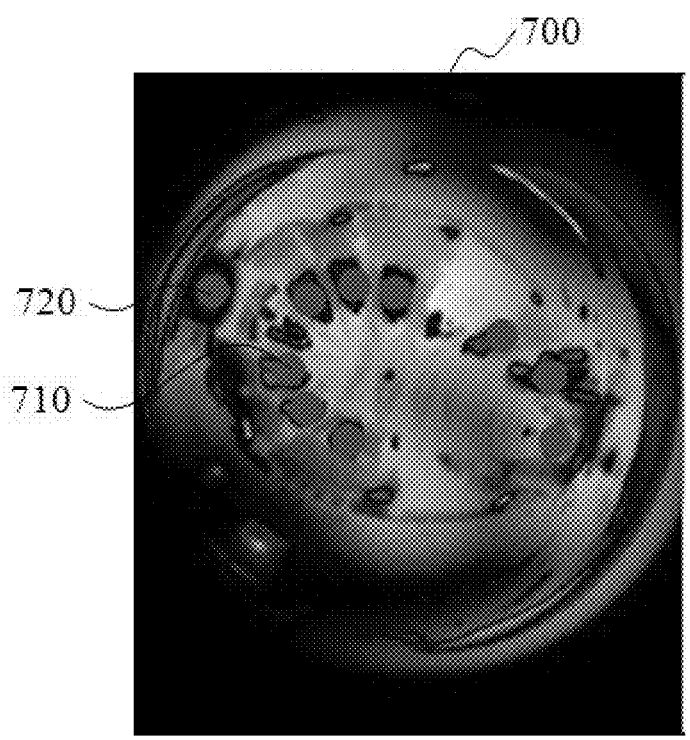
FIG. 7 illustrates an image to describe a process of sampling a virtual point light (VPL) from the difference image of FIG. 6 according to example embodiments.

FIG. 7 illustrates an image 700 to describe a process of sampling a VPL from the difference image 600 of FIG. 6 according to example embodiments.

The VPL sampling unit 140 or 230 may sample at least one VPL in a portion of the difference image 600 having a value greater than or equal to a predetermined threshold.

By performing VPL sampling as above, it is possible to efficiently perform importance based VPL sampling with respect to an input lighting environment image. Accordingly, the specular or glossy effect may be well expressed.

A sampled VPL 710 may correspond to the light 310 of the original input lighting environment image 300 of FIG. 3 and a VPL 720 may correspond to the light 320.

Figure 8:
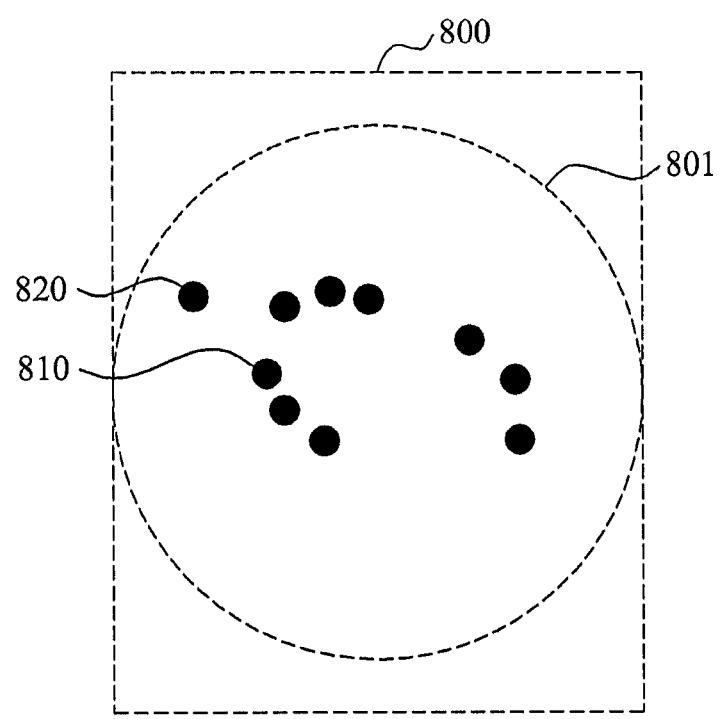
FIG. 8 illustrates a VPL sampled through the VPL sampling process of FIG. 7 according to example embodiments.

FIG. 8 illustrates a diagram 800 of a VPL sampled through the VPL sampling process of FIG. 7 according to example embodiments.

VPLs are sampled in a spherical area 801. The VPL 710 of FIG. 7 may correspond to a VPL 810 and the VPL 720 may correspond to a VPL 820.

The rendering unit 150 may render an object using such VPLs.

Hereinafter, an image processing method according to embodiments will be described with reference to the above process and FIG. 9 and FIG. 10.

FIG. 9 illustrates an image processing method according to example embodiments.

In operation 910, lighting environment information, for example, the lighting environment image 310 of FIG. 3 may be input into the image processing apparatus 100. The lighting environment information or the lighting environment image 300 is described above with reference to FIG. 1 and FIG. 3.

In operation 920, the filtering unit 110 may generate a filtered lighting environment image in which a low frequency component in the input lighting environment image is emphasized, by filtering out a high frequency component and passing the low frequency component. A Gaussian blurring process and the like is described as an example of the filtering process with reference to FIG. 1 and FIG. 4.

In operation 930, the difference image calculator 130 may calculate a difference image between the filtered lighting environment image and the original lighting environment image. The difference image is described above with reference to FIG. 1 and FIG. 6.

In operation 940, the VPL sampling unit 140 may sample at least one VPL by performing importance based sampling with respect to the difference image.

A process of performing VPL sampling with respect to the difference image is described above with reference to FIG. 7 and sampled VPLs are described above with reference to FIG. 8.

In operation 950, the rendering unit 150 may render an image.

In operation 950, the PRT calculator 120 may perform PRT calculation with respect to the filtered lighting environment image. For example, the PRT calculator 120 may calculate an SH coefficient corresponding to each of at least one basis function for SH by projecting the lighting environment image to the at least one basis function for SH.

The rendering unit 150 may render a color value according to a BRDF of the object using SH coefficients and VPLs, or by separately employing SH coefficients and VPLs.

The above process is described above with reference to FIG. 1.

FIG. 10 illustrates an image processing method according to other example embodiments.

In operation 1010, a lighting environment image may be input into the image processing apparatus 100.

In operation 1020, the filtering unit 110 may filter the input lighting environment image. The filtering unit 110 may generate a filtered lighting environment image in which a low frequency component in the input lighting environment image is emphasized, by filtering out a high frequency component and passing the low frequency component. A Gaussian blurring process and the like is described as an example of the filtering process with reference to FIG. 1 and FIG. 4.

In operation 1030, the PRT calculator 120 may perform PRT calculation with respect to the filtered lighting environment image. For example, the PRT calculator 120 may calculate an SH coefficient corresponding to each of at least one basis function for SH. Examples of basis functions are described above with reference to FIG. 5.

In operation 1040, the VPL sampling unit 140 may sample VPLs. Various embodiments, for example, importance based sampling that is directly performed with respect to the input lighting environment image, importance based sampling that is performed with respect to the difference image 600 of FIG. 6, and the like may be applied for the sampling process. The sampling process is described above with reference to FIG. 1, FIG. 7, and FIG. 8.

In operation 1050, the rendering unit 150 may perform primary rendering with respect to an object by employing each of or all of SH coefficients and VPLs.

A BRDF of the object may be used for the rendering process. Various rendering schemes may be employed, as described above with reference to FIG. 1.

Through the above process, large area lights may be realistically reflected for rendering with a relatively simple calculation. At the same time, the specular or glossy effect of small area lights, particularly, point lights with respect to the surface may be well expressed.

However, in the above process, only the direct light effect may be used and the indirect light effect associated with a reflection, a refraction, and the like of light on the surface of the object may not be used.

Accordingly, in operation 1060, the VPL sampling unit 140 may sample indirect light VPLs that represent the indirect light effect, using the primary rendering result of the rendering unit 150.

In operation 1070, the rendering unit 150 may perform secondary rendering of objects using the indirect light VPLs. In operation 1080, the rendering unit 150 may generate a final rendering result by merging the primary rendering result and the secondary rendering result.

The embodiments can be implemented in computing hardware and/or software, such as (in a non-limiting example) any computer that can store, retrieve, process and/or output data and/or communicate with other computers. For example, image processing apparatus 100 in FIG. 1 and image processing apparatus 200 in FIG. 2 may include a computer to perform operations and/or calculations described herein.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus comprising:
   a processor to control one or more processor-executable units;
   a filtering unit to filter an input lighting environment image, to thereby generate a filtered lighting environment image in which a low frequency component of the input lighting environment image is extracted, wherein the input lighting environment image comprises a plurality of pixels comprising information about a color of a light;
   a precomputed radiance transfer (PRT) calculator to calculate a spherical harmonics (SH) coefficient of the filtered lighting environment image;
   a difference image calculator to calculate, by a computer, a difference image showing a difference between the filtered lighting environment image and the input lighting environment image, to thereby generate a difference image in which a high frequency component of the input lighting environment image is extracted;
   a virtual point light (VPL) sampling unit to perform importance based VPL sampling with respect to the difference image, wherein the sampled VPL represents the high frequency component; and
   a rendering unit to perform a first rendering to generate a first rendering result for the input lighting environment image by summing a first result and a second result, the first result being generated by one rendering for the SH coefficient, and the second result being generated by another rendering for the sampled VPL;
   wherein the VPL sampling unit further samples at least one indirect light VPL using the first rendering result; and
   the rendering unit performs a second rendering of an additional image using the at least one indirect light VPL, and generates a final result image by merging the first rendering result and a second rendering result.

2. The image processing apparatus of claim 1, wherein the filtering unit generates the filtered lighting environment image by performing Gaussian blurring of the input lighting environment image.

3. The image processing apparatus of claim 1, wherein the PRT calculator expresses the filtered lighting environment image based on a PRT.

4. The image processing apparatus of claim 3, wherein the PRT calculator calculates a spherical harmonics (SH) coefficient corresponding to each of at least one basis function for SH by projecting the filtered lighting environment image to each of the at least one basis function for SH.

5. The image processing apparatus of claim 1, wherein the importance based VPL sampling is to arrange a VPL at a portion having at least a predetermined threshold in the difference image.

6. The image processing apparatus of claim 1, wherein the filtered lighting environment image comprises an area light having a size exceeding a predetermined value.

7. An image processing apparatus comprising:
   a processor to control one or more processor-executable units;
   a filtering unit to perform low band pass filtering of an input lighting environment image, to thereby generate a filtered lighting environment image in which a surface light source of a low frequency component is extracted while a point light source of a high frequency component is filtered out, wherein the input lighting environment image comprises a plurality of pixels comprising information about a color of a light;
   a precomputed radiance transfer (PRT) calculator to calculate a spherical harmonics (SH) coefficient corresponding to each of at least one basis function for SH by projecting the filtered lighting environment image to each of the at least one basis function for SH;
   a virtual point light (VPL) sampling unit to sample at least one direct light VPL by performing importance based VPL sampling with respect to the input lighting environment image; and
   a rendering unit to perform a first rendering to generate a first rendering result for the input lighting environment image by summing a first result and a second result, the first result being generated by one rendering for the SH coefficient, and the second result being generated by another rendering for the sampled VPL;
   wherein the VPL sampling unit further samples at least one indirect light VPL using the first rendering result; and
   the rendering unit performs a second rendering of an additional image using the at least one indirect light VPL, and generates a final result image by merging the first rendering result and a second rendering result.

8. The image processing apparatus of claim 7, wherein the low band pass filtering corresponds to Gaussian blurring.

9. A method of processing an image in an image processing apparatus, the method comprising:
   filtering, by a filtering unit of a computer, an input lighting environment image, to thereby generate a filtered lighting environment image in which a low frequency component of the input lighting environment image is extracted, wherein the input lighting environment image comprises a plurality of pixels comprising information about a color of a light;
   calculating, by a precomputed radiance transfer (PRT) calculator of the computer, a spherical harmonics (SH) coefficient of the filtered lighting environment image;
   calculating, by a difference image calculator of the computer, a difference between the filtered lighting environment image and the input lighting environment image, to thereby generate a difference image in which a high frequency component of the input lighting environment image is extracted;
   performing, by a virtual point light (VPL) sampling unit of the computer, importance based VPL sampling with respect to the difference image, wherein the sampled VPL represents the high frequency component;
   first rendering, by a rendering unit of the computer, to generate a first rendering result for the input lighting environment image by summing a first result and a second result, the first result being generated by one rendering for the SH coefficient, and the second result being generated by another rendering for the sampled VPL;

sampling, by the VPL sampling unit, at least one indirect light VPL using the first rendering result;

second rendering, by the rendering unit, an additional image using the at least one indirect VPL; and generating, by the rendering unit, a final result image by merging the first rendering result and a second rendering result.

10. The method of claim 9, wherein the calculating of the SH coefficient calculates the spherical harmonics (SH) coefficient corresponding to each of at least one basis function for SH by projecting the filtered lighting environment image to each of the at least one basis function for SH.

11. The method of claim 9, wherein the filtered lighting environment image comprises an area light having a size exceeding a predetermined value.

12. A non-transitory computer-readable medium storing instructions that, when executed by a processor, cause the processor to perform the method of claim 9.

13. A method of processing an image in an image processing apparatus, the method comprising:

performing, by a filtering unit of a computer, low band pass filtering of an input lighting environment image, to thereby generate a filtered lighting environment image in which a surface light source of a low frequency component is extracted while a point light source of a high frequency component is filtered out, wherein the input lighting environment image comprises a plurality of pixels comprising information about a color of a light;

calculating, by a precomputed radiance transfer (PRT) calculator of the computer, a spherical harmonics (SH) coefficient corresponding to each of at least one basis function for SH by projecting the filtered lighting environment image to each of the at least one basis function for SH;

sampling, by a virtual point light (VPL) sampling unit of the computer, at least one direct light VPL by performing importance based VPL sampling with respect to the input lighting environment image;

first rendering, by a rendering unit of the computer, to generate a first rendering result for the input lighting environment image by summing a first result and a second result, the first result being generated by one rendering for the SH coefficient, and the second result being generated by another rendering for the sampled VPL;

sampling, by the VPL sampling unit, at least one indirect light VPL using the first rendering result;

second rendering, by the rendering unit, an additional image using the at least one indirect VPL; and generating, by the rendering unit, a final result image by merging the first rendering result and the second rendering result.

14. A method comprising:

filtering, by a computer, an input lighting environment image, to thereby generate a filtered lighting environment image in which a low frequency component in the input lighting environment image is extracted, wherein the input lighting environment image comprises a plurality of pixels comprising information about a color of a light;

calculating, by a computer, a difference between the filtered lighting environment image and the input lighting environment image, to thereby generate a difference image in which a high frequency component in the input lighting environment image is extracted;

performing, by a computer, importance based virtual point light (VPL) sampling with respect to the difference image; and performing, by a computer, a rendering to generate a rendering result for the input lighting environment image by summing a first result and a second result, the first result being generated by one rendering for the filtered lighting environment image, and the second result being generated by another rendering for the sampled VPL.

15. The method of claim 14, further comprising calculating, by a computer, a spherical harmonics (SH) coefficient corresponding to each of at least one basis function for SH by projecting the filtered lighting environment image to each of the at least one basis function for SH;

wherein the one rendering for the filtered lighting environment image is a rendering for the SH coefficient.

16. The method of claim 14, wherein the sampled VPL is a direct light VPL.

17. The method of claim 14, wherein the filtered lighting environment image comprises an area light having a size exceeding a predetermined value.

18. A method of processing an image in an image processing apparatus, the method comprising:

filtering, by a filtering unit of a computer, an input lighting environment image, to thereby generate a filtered lighting environment image in which a low frequency component of the input lighting environment image is extracted, wherein the input lighting environment image comprises a plurality of pixels comprising information about a color of a light;

calculating, by a difference image calculator of the computer, a difference between the filtered lighting environment image and the input lighting environment image, to thereby generate a difference image in which a high frequency component of the input lighting environment image is extracted; and performing, by a rendering unit of the computer, a rendering to generate a rendering result for the input lighting environment image by summing a first result and a second result, the first result being generated by one rendering for the filtered lighting environment image, and the second result being generated by another rendering for the difference image.

19. The method of claim 18, further comprising calculating, by a precomputed radiance transfer (PRT) calculator of the computer, a spherical harmonics (SH) coefficient corresponding to each of at least one basis function for SH by projecting the filtered lighting environment image to each of the at least one basis function for SH;

wherein the one rendering for the filtered lighting environment image is a rendering for the SH coefficient.

20. The method of claim 19, further comprising performing, by a virtual point light (VPL) sampling unit of the computer, importance based VPL sampling with respect to the difference image;

wherein the other rendering for the difference image is a rendering for the sampled VPL.

21. A method of processing an image in an image processing apparatus, the method comprising:

inputting, by a computer, a lighting environment image comprising information about position and energy corresponding to at least one light source;

creating, by a computer, a first image representing a low frequency component of the at least one light source and a second image representing a high frequency component of the at least one light source; and performing, by a computer, a rendering to generate a rendering result for the lighting environment image by summing a first result and a second result, the first result being generated by one rendering for the first image, and the second result being generated by another rendering for the second image.

* * * * *